United States Patent
Sorelle, Jr. et al.

(10) Patent No.: US 10,736,301 B2
(45) Date of Patent: Aug. 11, 2020

(54) ANIMAL CONTROL DEVICE AND METHOD

(71) Applicants: Roland Raymond Sorelle, Jr., Elk City, OK (US); James Roxborough Chopping, Elk City, OK (US)

(72) Inventors: Roland Raymond Sorelle, Jr., Elk City, OK (US); James Roxborough Chopping, Elk City, OK (US)

(*) Notice: Subject to any disclaimer, the term of this patent is extended or adjusted under 35 U.S.C. 154(b) by 264 days.

(21) Appl. No.: 16/100,477

(22) Filed: Aug. 10, 2018

(65) Prior Publication Data

US 2019/0045740 A1    Feb. 14, 2019

Related U.S. Application Data

(60) Provisional application No. 62/605,412, filed on Aug. 11, 2017.

(51) Int. Cl.
  *A01K 1/02*   (2006.01)
  *A01K 1/015*  (2006.01)
  *A01K 1/03*   (2006.01)

(52) U.S. Cl.
  CPC .......... *A01K 1/0218* (2013.01); *A01K 1/0158* (2013.01); *A01K 1/03* (2013.01)

(58) Field of Classification Search
  CPC .......... A01K 1/00; A01K 1/02; A01K 1/0209; A01K 1/0218; A01K 1/03; A01K 1/031
  USPC .................. 119/502, 503, 505, 508, 516, 518
  See application file for complete search history.

(56) References Cited

U.S. PATENT DOCUMENTS

| | | | | |
|---|---|---|---|---|
| 3,941,093 A | * | 3/1976 | Sievers | A01K 1/0218 119/503 |
| 5,092,271 A | * | 3/1992 | Kleinsasser | F28F 21/062 119/508 |
| 5,233,940 A | * | 8/1993 | Berglund | A01K 1/0218 119/505 |
| 5,371,340 A | | 12/1994 | Stanfield | |
| 5,832,875 A | | 11/1998 | Van Gilst | |
| 7,185,610 B2 | * | 3/2007 | Romeu Guardia | A01K 1/0158 119/448 |
| 7,548,169 B2 | * | 6/2009 | Henry | A01K 1/0218 119/502 |
| 2020/0060223 A1 | * | 2/2020 | Lefebvre | A01K 5/0283 |

FOREIGN PATENT DOCUMENTS

WO    WO2008043155 A1    4/2008

* cited by examiner

*Primary Examiner* — Richard T Price, Jr.
(74) *Attorney, Agent, or Firm* — R. William Graham

(57) ABSTRACT

This invention describes a device method of moving an animal from one location to another by manipulating the local environment. This invention describes a method to use newborns natural instincts to find warmth to move newborns to a safe area. This invention describes an improvement to a nesting or whelping box, constructed with a pig rail and a heat source to protect the newborns to keep them from being smothered or dying from hypothermia.

12 Claims, 2 Drawing Sheets

ANIMAL CONTROL DEVICE AND METHOD

This application claims the benefits of prior U.S. application 62/605,412 filed Aug. 11, 2017.

BACKGROUND OF INVENTION

The present invention is in the technical field of animal control. More particularly, the present invention is in the technical field of neonatal care which provides an animal control device and a method employing the same.

PRIOR ART

Moving animals from one location to another is a fundamental part of the care and handling of animals, typically this is achieved by positive or negative inputs, example might be food, whips and verbal commands etc. These techniques do not work well on neonates. This invention describes a method of moving an animal from one location to another by manipulating the local environment this could be by controlling but is not limited to heat, cold, noise, vibration, light, smell, texture, inclination slope, movement flow of air, or touch individually or in any combination to the environment.

Newborn need warmth more than food. At birth the newborn's body temperature is the same as the mother's, after delivery the core temperature will drops several degrees the body (rectal) temperature should fall between 95° and 99° F. If it drops below 94° F., the newborn could be facing life-threatening hypothermia. Newborns depend on their mother to maintain their body temperature, without external heat, it doesn't take long for a newborn to become chilled. Chilling gravely reduces the newborns metabolism, newborns can't generate their own body heat until they develop the shiver reflex at around two and half weeks. As a general rule newborns critical need for additional heat decrease over time, the first week being the most critical for the newborns, they would ideally want a room temperature of about 90° F., during the second week a temperature of about 85° F., the third week about 80° F. and the fourth week about 72° F.

The general application of heat is beneficial for the newborns but it can overheat and stress the mother often to the point that she doesn't want to be in the same space and spends considerable time standing to avoid the heat during which time the newborns cannot nurse.

SUMMARY OF INVENTION

One-instance of this invention is a nesting or whelping box, (area for newborn animals in the first few weeks, of the life). Newborns are very vulnerable to being smothered by the mother or dying from hypothermia. Often the inside perimeter of the nesting or whelping box has a ledge or shelf a small distance above the floor usually referred to as a pig rail the purpose of which is to protect the newborn from being pushed against the outer perimeter wall by the mother and being suffocated or trapped.

The preferred embodiment of this invention is to place a heat source directly under the pig rail, the newborns then move instinctively to find warmth and stay on this safe heated area under the pig rail. The newborns will stay in this safe area when not feeding and then move to the mother for feeding the added benefit is that since heat is only added in specific areas the mother is not continually subjected to this additional heat and stress. The newborns will remain under the pig rail until they get hungry and seek food or the environment in this area is made uncomfortable for example by adding or subtracting heat. Another area around the mother can be similarly manipulated by adding heat or other methods to make this new area favorable for the newborns. Any plurality of areas can manipulated in a similar fashion to aid and benefit the animals. The newborn follow their natural instinct and by manipulating these areas a newborn will move between these preferred areas.

DETAILED DESCRIPTION OF PREFERRED EMBODIMENT

Figure 1:
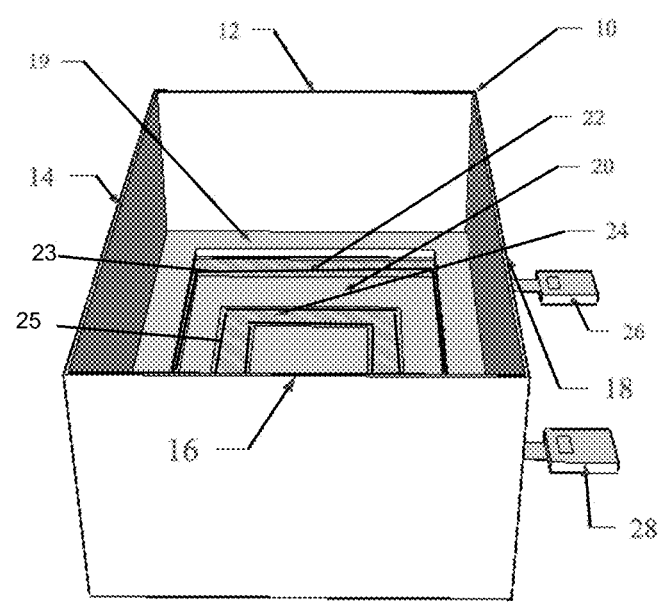
FIG. 1 is a perspective view of the present invention, a container with two independently controllably environments.

Referring now to the invention in more detail, in FIG. 1 there is shown a container 10 having four sides 12, 14, 16, 18 and a floor which is referred to as a nesting or whelping box. A ledge 19 is connected to the walls and is generally parallel to and disposed a distance above the floor 20 and around an interior perimeter of sides 12, 14, 16, 18. The ledge 19 is sometimes referred to as a pig rail. The floor 20 comprises two areas 22 and 24 each operatively connected to an independent controller 26 and 28, respectively. Controllers 26 and 28 provide for changing the temperature of the respective areas 22 and 24.

Figure 2:
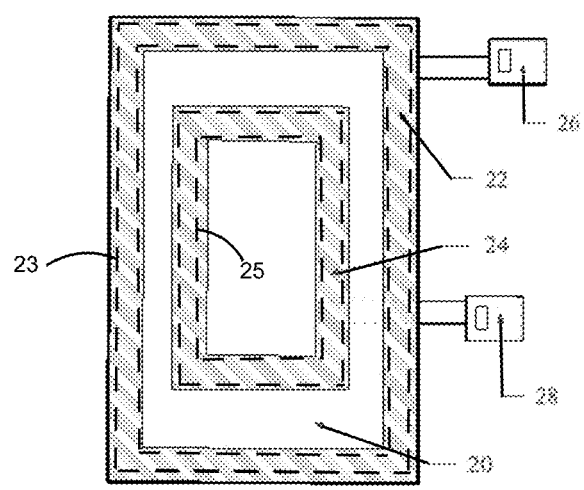
FIG. 2 is a plan view of the container FIG. 1 with two independently controllably environments.

In more detail, still referring to the invention of FIG. 1 and FIG. 2, the container 10 is sufficiently wide and long for comfortably containing a mother and the newborns, for example sides 14, 18 can be about 42 inches long and about 18 inches tall and sides 12, 16 can be about 28 inches long and about 18 inches tall. The ledge 19 can be located about 2.5 inches above the floor 20 and extends inwardly from the walls 12, 14, 16, 18 about 3 inches. There is provided independent controllable environment, wherein there is an area on the floor 20 extending inward from the walls 12, 14, 16, 18 about 3 inches. The controller 26 allows for setting the temperature of area 22. The independently controllably environment 24, is an area on the floor 20 and is centrally located in the floor 20 and is approximately 70% of the size of area 22 and constructed in a similar fashion the controller 28 allows for setting the temperature of area 24.

In this regard, there are provided thermal controlled devices 23 and 25 which operatively connect to areas 22 and 24, respectively, and to the controllers 26 and 28, respectively. The controllers 26 and 28 provide for controlling the temperature of respective areas 22 and 24 via the thermal controlled devices 23 and 25. The controllers 26 and 28 are programmable equipped with an on/off switch and scheduling component to adjust temperature based on an age and needs of the newborn.

The construction material for the container 10 of the invention as shown in FIG. 1 and FIG. 2 are known to those in the industry. Suitable materials must be sufficiently stiff, moisture proof and safe for the mother and her newborns examples are wood, plastic, synthetic material, metals, and the like. The container 10 can have one or more opening for easy access for mother and care of newborns it can have a fixed or removable top, hinged or lockable lid.

The pig rail 19 is can be made of suitable materials which must be sufficiently stiff, moisture proof and safe for the mother and her newborns examples are wood, plastic, synthetic material, metals, and the like. The floor 20 can be fixed or removable made of a suitable material to be moisture resistant and of sufficient strength to support the mother and newborns to contain them safely. It is contemplated that the floor 20 can be part of an existing floor or separate floor where the sides 12, 14, 16 and 18 are fixably disposed on the floor 20 and the thermal controlled devices 23 and 25 are operatively disposed on the floor 20 relative to the sides 12, 14, 16 and 18. Areas 22 and 24 can include the thermal controlled devices 23 and 25 (resistive elements) the temperature of each is adjusted by controllers 26 and 28 respectively, thus controlling the thermal controlled devices 23 and 25 via the thermal controllers 26 and 28 to cause the areas 22 and 24 to reach a predetermined temperature(s). The thermal devices 23 and 25 can be above, below or integral to floor 20.

The above describes one of many embodiments. There could be a plurality of controllable areas, manipulated using conduction, radiation or convection. These areas can be manipulated by moving fluids, by light sources or other methods. The controlled areas could be in the walls (and hence the thermal devices situated there), in the pig rail or any place that would be preferable for the animals. Fluids could be warmed or cooled air, blown through the pig rail and vented towards the preferred area. Fluids could be a warmed or cooled liquid or gas flowing through the controlled area, lights could also be used to manipulate these controlled areas.

The above embodiment is one of many ways to construct the container. The geometry and size, will vary to suit the animal and users preference.

The advantages of the present invention include, without limitation that it provides a safe environment for the newborns by moving them to the area under the pig rail. The newborns wellbeing is further enhanced by providing a warm area preventing hyperthermia. The controlled temperature can be varied depending on the needs and age of the newborns. The added advantage of having a selectively heated area is preventing the mother from becoming over heated. In broad embodiment, the present invention is a method to control the movement of an animal comprising a plurality of areas in which the environment of each area can be individually controlled by which means the animal follows it's instinct to move from the current location to another more favorable one. This invention places the heat sources under the pig rail or other safe areas. The newborns follow their natural instinct and by manipulating these areas a newborn will move between these preferred areas. This also has the advantage of not positioning heat under the mother avoiding overheating and stressing her. Furthermore, a number of independent areas can be warmed or cooled to control the movement of newborns for their safety and handling.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. An animal control device, which comprises:
   a floor;
   a side wall extending upward from and encompassing said floor forming a container,
   a ledge connected to said side wall disposed a distance above said floor and extends inwardly from said side wall;
   a first thermal controller;
   at least one thermal controlled device adjacent said ledge and operatively connected to a first area on said floor and said first thermal controller providing a controlled temperature of said first area.
2. The animal control device of claim 1, wherein said first area is under said ledge.
3. The animal control device of claim 1, wherein said ledge is generally parallel to said floor.
4. The animal control device of claim 1, wherein said ledge extends around an interior perimeter of said side wall.
5. The animal control device of claim 1, which is further characterized to include a second controller and a second thermal device operatively connected to a second distinct area on said floor and said second thermal controller providing a controlled temperature of said second distinct area.
6. The animal control device of claim 1, which is further characterized to include a second thermal device operatively connected to a second distinct area on said floor and said thermal controller providing a controlled temperature of said second distinct area.
7. A method of controlling animal behavior, which includes the steps of:
   employing an animal device having a floor, a side wall extending upward from and encompassing said floor forming a container, a ledge connected to said side wall disposed a distance above said floor and extends inwardly from said side wall, a first thermal controller, at least one thermal controlled device adjacent said ledge and operatively connected to a first area on said floor and said first thermal controller providing a controlled temperature of said first area;
   disposing an animal in said container;
   controlling said thermal controlled device via said thermal controller to cause said first area to reach a predetermined temperature and cause the animal to migrate within said container as a function thereof.
8. The method of controlling animal behavior of claim 7, which is further characterized such that said first area is under said ledge.
9. The method of controlling animal behavior of claim 7, which is further characterized such that said ledge is generally parallel to said floor.
10. The method of controlling animal behavior of claim 7, which is further characterized such that said ledge extends around an interior perimeter of said side wall.
11. The method of controlling animal behavior of claim 7, which is further characterized to include a second controller and a second thermal device operatively connected to a second distinct area on said floor and said second thermal controller providing a controlled temperature of said second distinct area causing the animal to migrate within said container as a function thereof.
12. The method of controlling animal behavior of claim 7, which is further characterized to include a second thermal device operatively connected to a second distinct area on said floor and said thermal controller providing a controlled temperature of said second distinct area causing the animal to migrate within said container as a function thereof.

* * * * *